UNITED STATES PATENT OFFICE.

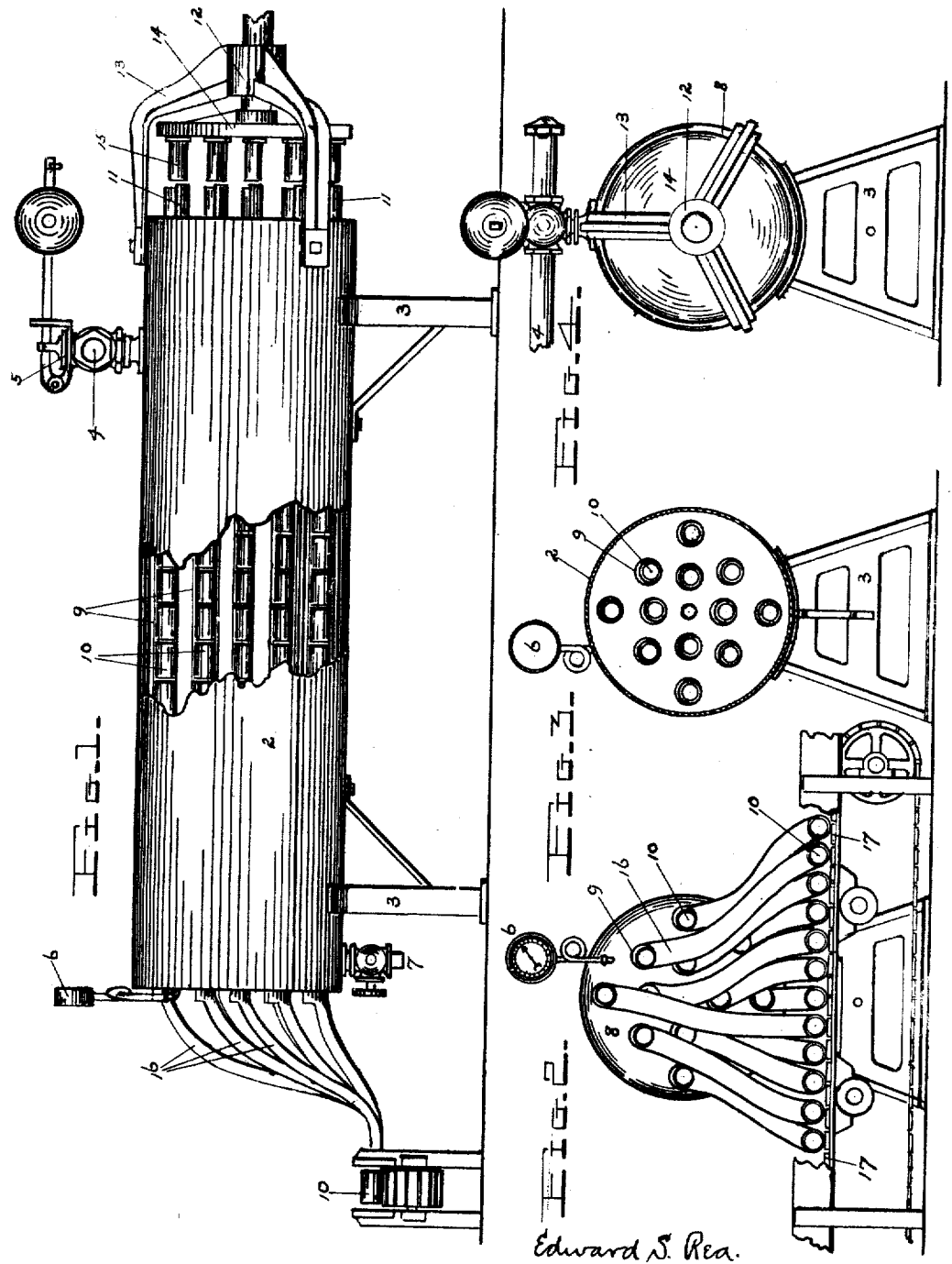

EDWARD S. REA, OF SAN FRANCISCO, AND WILLIAM S. REA, JR., OF OAKLAND, CALIFORNIA.

AUTOMATIC CONTINUOUS COOKER FOR FOOD PRODUCTS IN HERMETICALLY-SEALED CONTAINERS.

1,209,619.    Specification of Letters Patent.    Patented Dec. 19, 1916.

Application filed February 29, 1916. Serial No. 81,214.

*To all whom it may concern:*

Be it known that we, EDWARD S. REA and WILLIAM S. REA, Jr., citizens of the United States, and residents, respectively, of the city and county of San Francisco and State of California, and of the city of Oakland, county of Alameda, and State of California, have invented an Automatic Continuous Cooker for Food Products in Hermetically-Sealed Containers; and we do hereby declare the following to be a full, clear, and exact description of our invention, such as will enable others skilled in the art to which it appertains to make and use the same.

This invention relates to automatic continuous cookers for hermetically sealed packages containing food products, and especially to that type of cookers in which live steam is employed as the heat producing agent; and it consists in the novel construction and arrangement of parts hereinafter described.

The object of our invention is to provide an automatic mechanism which will make it possible for the sealed containers to be inserted, cooked and withdrawn, continuously, without lowering the temperature of the cooker or permitting the steam to escape; which will conserve the heat imparting energy; and which will cheapen the manufacturing cost of preparing this class of food products.

Heretofore, food products in hermetically sealed containers have been cooked in retorts, or other vessels adapted to sustain internal pressure. All such retorts are heated by live steam admitted directly into the retorts which hold the sealed containers. Before the door of the retort can be opened and the cooked products removed, it is necessary to blow off the steam and to allow the retort to cool down, the result being loss of time and loss of heat energy. By our novel construction, as hereafter described, we not only obviate these losses, but we also eliminate much of the labor at present necessary in handling the sealed containers.

In order that our invention may be clearly understood and readily carried into effect, the same is described with reference to the accompanying drawings, in which similar numerals indicate like parts:—

Figure 1, is a side elevation of the cooker with the middle portion broken away to show the tubes filled with the containers. Fig. 2, is a rear elevation of the cooker showing chute-system and conveyer. Fig. 3, is a sectional view of Fig. 1, through the center and looking rearward. Fig. 4, is a front elevation of the cooker.

In detail, our construction consists of a cylinder, 2, adapted to sustain internal pressure, mounted on suitable supports, 3. Steam is admitted to the cylinder through the intake pipe, 4, provided with a combined safety-valve and exhaust, 5. On the top and at the rear end of the cylinder is mounted a steam-gage, 6. On the lower side of the cylinder an outlet, 7, is provided for carrying off the water caused by condensation.

Running through the cylinder and suitably affixed to the heads, 8, thereof, is a series of tubes, 9, open at each end, and adapted to receive the hermetically sealed food containers, 10. These tubes constitute the cooking chambers for the food products during the cooking process, and they also serve as conduits for the containers during their progress through the said cylinder. At the front end of the cylinder, each tube projects outward and is cut away, as at 11, for greater convenience in inserting therein the food containers.

Our mechanism for propelling the food containers through the tubes in the cylinder consists of an automatic ram operated by any suitable means, not shown in the drawings, capable of being so regulated that the ram moves forward and returns to its position at stated intervals. The ram's forward journal-box, 12, is carried in the triangular frame, 13, suitably attached to the forward end of the said cylinder. The head of the ram is provided with the disk-plate, 14, to which is affixed a series of plungers, 15, so arranged that each of the series is directly opposite one of the said tubes, 9. At the rear end of the cylinder the tubes are connected with a chute-system, 16, through means of which the sealed containers are delivered to a suitable conveyer, 17.

The cylinder is heated to the desired degree of temperature by means of live steam admitted through the intake-pipe, 4. A food container is then inserted in the forward end of each of the tubes, at 11. As the ram moves forward the plungers, 15, contact with the containers in the tubes directly opposite, and each container is thus advanced into its respective tube. The ram then returns to its position. Another container is then inserted in each of the said tubes. These containers are also advanced by the next forward movement of the ram. In so advancing each container contacts with the container just ahead of it in its respective tube and consequently advances that container. By a repetition of these operations the containers are gradually advanced until they complete their passage through the tubes. As the ram's movements are capable of being so regulated that the ram moves forward only at stated intervals, and as the temperature of the cylinder is capable of being so regulated that any degree of temperature may be maintained, the action of the ram and the temperature of the cylinder may be so regulated with reference to each other that when the gradually advanced containers emerge from the cylinder the food products are thoroughly cooked. It is obvious from the above that these cookers may be used continuously as long as desired, without any break in the cooking process.

While we have shown in the drawings accompanying this specification what we consider to be the most desirable and our present form and method of construction of our cookers, it is evident that changes and variations of parts and locations of parts may be made without departing from the spirit and scope of our invention, and we therefore desire to include herein such possible changes and variations.

Having thus described our invention, what we desire to claim and to secure by Letters Patent, is:

1. In a steam cooker for food products in hermetically sealed containers, a cylinder adapted to sustain internal pressure and provided with a suitable steam intake, a series of open tubes within said cylinder and adapted to serve as conduits for said containers during their passage through said cylinder, in combination with a time-regulated automatic ram for advancing said containers through said tubes.

2. In a cooker for food products in hermetically sealed containers, a cylinder adapted to sustain internal pressure and provided with a series of open tubes extending longitudinally through the length thereof, said tubes adapted to serve both as cooking chambers for said food products and as conduits for said containers during their passage through said cylinder, and a ram for advancing said containers through said tubes.

3. In a cooker for food products in hermetically sealed containers, a cylinder adapted to receive steam, a series of open tubes extending through said cylinder and adapted to serve as cooking chambers for said food products and as conduits for said containers during their passage through said cylinder, in combination with propelling means for said containers.

4. In a cooker for food products in hermetically sealed containers, the combination of a cylinder adapted to receive steam under pressure, a series of open tubes extending through the heads of said cylinder, and an intermittently operating ram, substantially as shown, and for the purposes set forth.

5. In a cooker for food products in hermetically sealed containers, a cylinder adapted to receive steam, a series of open tubes extending through the heads of said cylinder and adapted to serve as cooking chambers for said food products and as conduits for said containers during their passage through said tubes, in combination with a ram adapted to automatically advance said containers through said cylinder.

In testimony whereof we have hereunto affixed our respective signatures in the presence of two subscribing witnesses.

EDWARD S. REA.
WILLIAM S. REA, Jr

Witnesses:
  MATTIE G. STIRLING,
  FRANCIS ST. J. FOX.